(12) United States Patent
Hattori et al.

(10) Patent No.: US 8,504,981 B2
(45) Date of Patent: Aug. 6, 2013

(54) APPLICATION DEVELOPMENT SUPPORT DEVICE, PROGRAM, AND RECORDING MEDIUM

(75) Inventors: Takahisa Hattori, Tokyo (JP); Motonari Chinuki, Inzai (JP); Tatsuki Takeuchi, Matsudo (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 590 days.

(21) Appl. No.: 12/865,020

(22) PCT Filed: Mar. 18, 2008

(86) PCT No.: PCT/JP2008/054974
§ 371 (c)(1),
(2), (4) Date: Jul. 28, 2010

(87) PCT Pub. No.: WO2009/096045
PCT Pub. Date: Aug. 6, 2009

(65) Prior Publication Data
US 2010/0333064 A1 Dec. 30, 2010

(30) Foreign Application Priority Data
Jan. 30, 2008 (JP) .................................. 2008-019666

(51) Int. Cl.
*G06F 9/44* (2006.01)
(52) U.S. Cl.
USPC ............................ 717/106; 717/109; 717/120
(58) Field of Classification Search
None
See application file for complete search history.

(56) References Cited

U.S. PATENT DOCUMENTS

| | | | |
|---|---|---|---|
| 7,080,350 B2 * | 7/2006 | Saimi et al. | 717/106 |
| 7,340,714 B2 * | 3/2008 | Upton | 717/120 |
| 7,353,249 B2 | 4/2008 | Takahashi | |

(Continued)

FOREIGN PATENT DOCUMENTS

| EP | 1 569 418 A1 | 8/2005 |
|---|---|---|
| JP | A-2003-108558 | 4/2003 |

(Continued)

OTHER PUBLICATIONS

Mnaouer et al., "A Generic Framework for Rapid Application Development of Mobile Web Services with Dynamic Workflow Management", 2004 IEEE, SCC'04, pp. 1-7; <http://ieeexplore.ieee.org/stamp/stamp.jsp?tp=&arnumber=1358004>.*

(Continued)

*Primary Examiner* — Thuy Dao
*Assistant Examiner* — Ben C Wang
(74) *Attorney, Agent, or Firm* — Oliff & Berridge, PLC

(57) ABSTRACT

The development of an application that includes a user interface (UI), which has a specific UI screen that is directly called through an external link and displays an execution result of a specific service, is realized without coding operations. Before constructing a UI using a first tool, condition starting buttons, which respectively correspond to a plurality of services that can be provided by programs generated using a second tool and which are respectively added call programs for calling corresponding service, are generated. When a specific condition starting button is placed in a UI screen under construction and the conversion for a unconditional starting is instructed, an attribution is changed so that the button becomes invisible and the specific condition starting button is changed to a unconditional starting button by changing a call program so that the call program is unconditionally executed when the UI screen is called through a link.

7 Claims, 9 Drawing Sheets

U.S. PATENT DOCUMENTS

| | | | | |
|---|---|---|---|---|
| 7,437,710 B2 * | 10/2008 | Bau et al. | | 717/109 |
| 7,707,564 B2 * | 4/2010 | Marvin et al. | | 717/106 |
| 7,721,219 B2 * | 5/2010 | Harsh et al. | | 715/762 |
| 7,873,946 B2 * | 1/2011 | Lathrop et al. | | 717/106 |
| 7,895,566 B2 * | 2/2011 | Shenfield et al. | | 717/106 |
| 7,966,601 B2 * | 6/2011 | Yamaizumi et al. | | 717/106 |
| 7,992,127 B2 * | 8/2011 | Loupia et al. | | 717/106 |
| 8,095,911 B2 * | 1/2012 | Ronen et al. | | 717/120 |
| 8,127,234 B2 * | 2/2012 | Matsutsuka et al. | | 717/120 |
| 8,140,987 B2 * | 3/2012 | Keren et al. | | 715/763 |
| 8,239,830 B2 * | 8/2012 | Ionfrida et al. | | 717/120 |
| 8,266,700 B2 * | 9/2012 | Sima et al. | | 726/25 |
| 8,341,595 B2 * | 12/2012 | Arner et al. | | 717/120 |
| 2003/0115572 A1 * | 6/2003 | Zondervan et al. | | 717/109 |
| 2003/0182392 A1 * | 9/2003 | Kramer | | 709/217 |
| 2006/0004768 A1 * | 1/2006 | Betts et al. | | 707/10 |
| 2006/0294500 A1 * | 12/2006 | Chiang | | 717/109 |
| 2007/0157096 A1 | 7/2007 | Keren et al. | | |
| 2007/0220115 A1 * | 9/2007 | Srinivasan et al. | | 709/219 |
| 2007/0234291 A1 * | 10/2007 | Ronen et al. | | 717/120 |
| 2008/0263194 A1 * | 10/2008 | Choi et al. | | 709/224 |
| 2010/0125827 A1 * | 5/2010 | Francis et al. | | 717/106 |
| 2012/0324377 A1 * | 12/2012 | Allington et al. | | 715/763 |
| 2013/0055117 A1 * | 2/2013 | Sahibzada et al. | | 715/762 |
| 2013/0073994 A1 * | 3/2013 | Liao et al. | | 715/762 |

FOREIGN PATENT DOCUMENTS

| | | |
|---|---|---|
| JP | A-2004-038559 | 2/2004 |
| JP | A-2005-092522 | 4/2005 |
| JP | A-2006-053832 | 2/2006 |
| JP | A-2006-268121 | 10/2006 |

OTHER PUBLICATIONS

Whitmore et al., "Oracle Fusion Middleware—Web User Interface Developer's Guide for Oracle Application Development Framework", 2011 Oracle Incorporation, 11g Release, B31973-09, pp. 1-974; <http://docs.oracle.com/cd/E21764_01/web.1111/b31973.pdf>.*

He et al., "An Adaptive User Interface Generation Framework for Web Services", 2008 IEEE, pp. 175-182; <http://ieeexplore.ieee.org/stamp/stamp.jsp?tp=&arnumber=4700516>.*

Paternò et al., "Exploiting Web Service Annotations in Model-based User Interface Development", 2010 ACM, EICS'10, Jun. 19-23, 2010, Berlin, Germany, pp. 219-224; <http://dl.acm.org/citation.cfm?doid=1822018.1822053>.*

Grechanik et al., "Composing Integrated Systems Using GUI-Based Applications and Web Services," 2007 IEEE International Conference on Services Computing (SCC 2007), Jul. 1, 2007, pp. 68-75, Piscataway, NJ, USA.

Majithia et al., "Triana: A Graphical Web Service Composition and Execution Toolkit," Proceedings of the IEEE International Conference on Web Services (ICWS'04), Jul. 6-9, 2004, pp. 514-521, Piscataway, NJ, USA.

Dec. 7, 2011 Search Report issued in European Application No. 08722368.1.

Sugi, "Fusion Middleware, Complete Anatomy, Precedent Java Development by Oracle with EJB3.0/JPA, Dramatically Improvement for Production Efficiency with Platform ADF", *Middleware Magazine*, Dec. 1, 2006, vol. 16, No. 9, pp. 93-97 (with partial English-language translation).

Prosise, "asp.net Programming, Web Forms Let You Drag and Drop Your Way to Powerful Web Apps," *msdn magazine*, Jun. 2001, No. 15, p. 53 (with partial English-language translation).

Ohsawa, "asp.net & JSF, New Dissection Book, Different Motion for Input Error, Confirm asp.net by Property," Nikkei System Integration, May 26, 2005, No. 146, p. 120 (with partial English-language translation).

Response to Written Opinion in International Application No. PCT/JP2008/054974; dated Jun. 3, 2008 (with English-language translation).

International Search Report in International Application No. PCT/JP2008/054974; dated Jun. 3, 2008 (with English-language translation).

* cited by examiner

EXAMPLE OF UI CONSTRUCTION TOOL

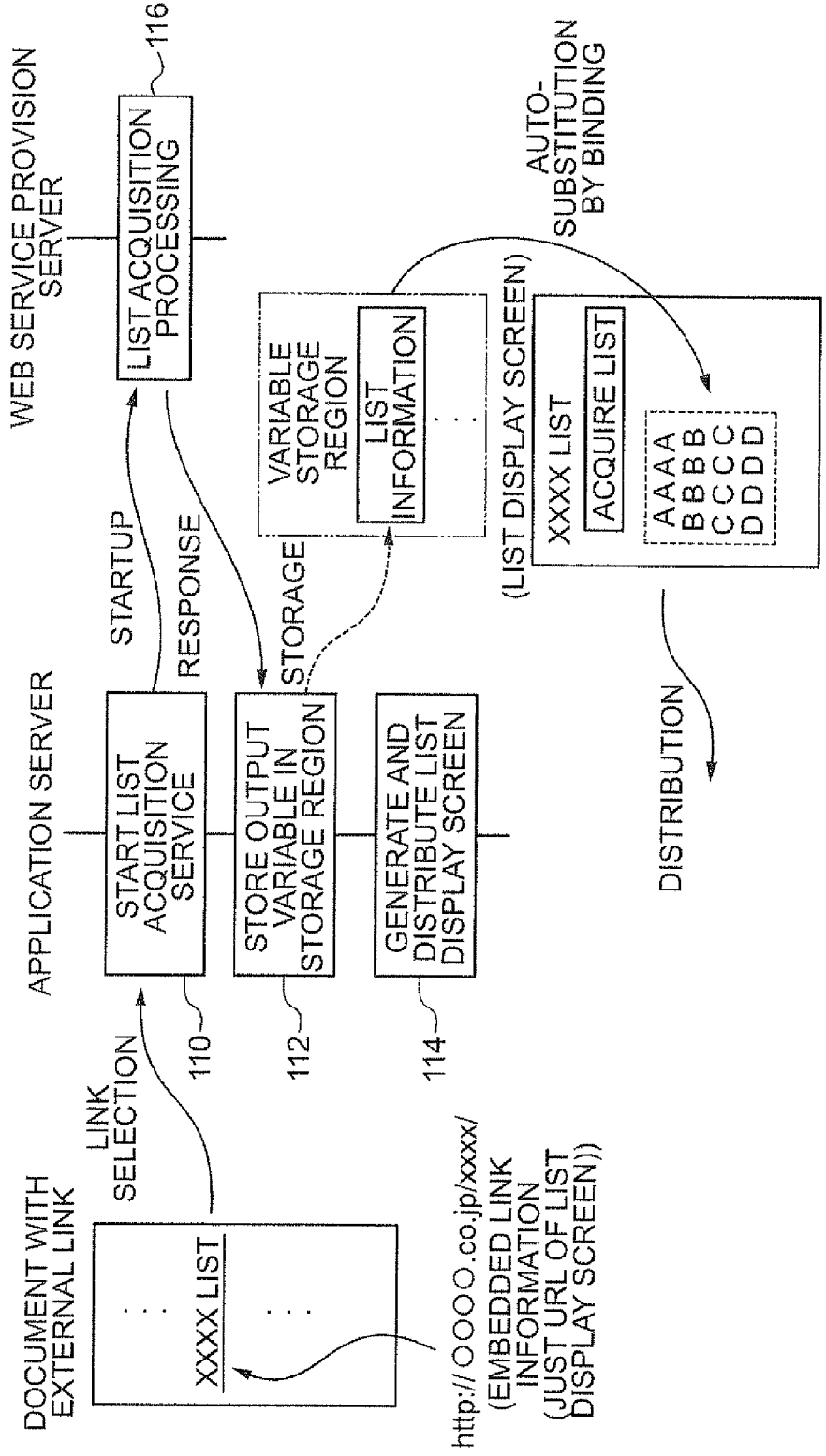

US 8,504,981 B2

APPLICATION DEVELOPMENT SUPPORT DEVICE, PROGRAM, AND RECORDING MEDIUM

TECHNICAL FIELD

The present invention relates to an application development support device, program and storage medium, and more particularly relates to an application development support device that supports the development of an application program using plural types of tools, an application development support program for causing a computer to function as the application development support device, and a storage medium storing the application development support program.

BACKGROUND ART

Recently, Business Process Execution Language (BPEL), which is used as a standard (language) capable of describing business processes as workflows, has been growing in popularity. In relation to BPEL, tools have been prepared that are capable of visually describing desired workflows by performing operations to select and combine desired components from plural types of components corresponding to mutually different processes, and that are capable of automatically generating programs conforming to BPEL from the workflows that are created, and an execution environment in which a program automatically generated by such a tool is executed by a computer may be constructed. Therefore, by utilizing these tools, the development of a program that realizes a workflow providing a desired web service by means of a computer may be performed easily and in a short time without coding operations that require knowledge relating to programming languages.

Java® Server Faces (JSF) is known as a standard for constructing user interfaces for web applications. In relation to JSF, tools have been prepared with which, by performing operations such as selecting and providing desired symbols from plural types of symbol that are usable as structural elements of a user interface screen and the like, design of a user interface screen, construction of a user interface with definitions of transitions of user interface screens and the like, and suchlike are possible. Thus, these tools are capable of automatically generating a program that realizes the constructed user interface. By utilizing such a tool, a program that realizes a desired user interface may be provided easily and in a short time without coding operations. Therefore, in the development of a web application, if programs of user interface parts of the web application are automatically generated using a JSF tool and programs of portions that provide web services are automatically generated using a BPEL tool, coding operations are not necessary at all. Thus, it is expected that a great reduction in development times may be realized.

However, no consideration has been given to programs automatically generated by using JSF (programs that realize user interfaces) being operated in conjunction with programs automatically generated by using BPEL (programs that realize workflows) (i.e., processing that calls another program is not defined as a standard). For example, in order to construct a user interface that includes a specific user interface screen which is directly called by a link being selected (for example, a hyperlink pasted into an arbitrary text, an Internet shortcut or the like) and which displays a result of execution of a specific web service, a program that starts a specific program providing the specific web service must be separately created by a coding operation and added to the specific user interface screen. Therefore, even when programs of the user interface parts in a development target user application are automatically created by using a JSF tool and programs of the parts providing web services are automatically generated by using a BPEL tool, coding operations are necessary anyway. Consequently, a great reduction of development times has been difficult.

In Japanese Patent Application Laid-Open (JP-A) No. 2003-108558 (Patent Reference 1) concerning the above, a technology is proposed in which a socket communications program capable of communicating with a web server without using a web browser is provided at a client terminal, and a program is provided at a web server for performing exchanges with a database on a data server in accordance with requests sent from the client terminal by means of the socket communications program and sending results thereof to the client terminal. Thus, displaying results without using a web browser at the client terminal is enabled, and automation of data processing is realized.

In JP-A No. 2006-268121 (Patent Reference 2), a technology is proposed in which, at an application server having a first virtual machine that implements an interface with a client and a second virtual machine that executes various business objects, identifiers of data necessary for processing of the business objects are stored for each business object. The first virtual machine displays an arbitrary screen at the client and implements arbitrary data input and, when receiving a request that includes form data and calling a business object corresponding to the received request, acquires identifiers of respective data required by the called business object and, of respective data included in the form data, transfers to the second virtual machine only data whose identifiers match the acquired identifiers. Thus, coding for processing to extract data required at the second virtual machine side is unnecessary.

In JP-A No. 2004-38559 (Patent Reference 3), a technology is disclosed in which a web application control device, which assigns task processing in accordance with details of requests from clients to any of plural task processing modules that have been prepared and returns processing results to the request source clients, receives a request from a client including data that is a target of task processing together with identification information of the task processing to be executed, assigns the processing to a task processing module corresponding to the received identification information, acquires a processing result, assigns processing result screen generation processing to any of plural screen generation modules on the basis of the identification information and the processing result of the task processing module, generates the assigned processing result screen data, and outputs it to the request source client as a response.

DISCLOSURE OF INVENTION

Problem to be Solved by the Invention

The technologies recited in the above-described Patent Reference 1 to Patent Reference 3 are all technologies that realize the utilization of desired web services from client terminals. However, these technologies give no consideration to a case in which a specific user interface screen that displays a processing result of a specific web service is directly called from a link, and it is necessary to perform coding operations when constructing a user interface that includes the above-described specific user interface screen. If even a small amount of coding operations are necessary in development of a program, there are problems in that a person responsible for the development has to be a person with knowledge about programming languages and, because debugging operations are required for programs that are created by coding operations, the development time is greatly lengthened compared to a case in which coding operations may be omitted.

The present invention has been made in consideration of the circumstances described above and an object is to provide an application development support device, application development support program and storage medium that are capable, without a coding operation, of realizing development of an application program having a user interface that includes a user interface screen that is directly called from a link and displays a result of execution of a specific web service.

Means for Solving the Problem

In order to achieve the object described above, an application development support device relating to the invention recited in claim 1 supports development of an application program including a first program and a second program, which is performed using a first tool that, when plural types of symbol that are usable as structural elements of a user interface screen are displayed at a display screen and a construction target user interface is defined by at least a first operation that designs a user interface screen being performed by a developer locating a desired symbol of the plural types of symbol at a desired position in a screen, generates the first program for realizing the user interface and a second tool that, when a flowchart that defines processing that provides a desired web service is created by a developer, generates the second program for executing the processing that the created flowchart represents, the application development support device including: a symbol generation component that generates, as a starting symbol that is usable as a structural element of the user interface screen and is for calling the second program generated using the second tool and causing processing that provides the predetermined web service to be performed, an unconditional starting symbol to which a third program is added that, when a user interface screen in which the unconditional starting symbol is located is called at a time of operation, unconditionally performs processing that causes the second program to be started and causes processing that provides the predetermined web service to be executed.

In the invention recited in claim 1, the first tool displays plural types of symbol that are usable as structural elements of a user interface screen and, when a construction target user interface is defined by a developer performing at least the first operation of designing a user interface screen by locating desired symbols of the plural types of symbols at desired positions in the screen, generates the first program for realizing the user interface. More specifically, for example, as is recited in claim 5, the first tool may be a tool that generates a first program when a construction target user interface is defined by a developer performing, in addition to the first operation: a second operation, of relating each individual information input/display space located in the user interface screen designed by the first operation with a storage region of a corresponding variable among plural variables for which storage regions are provided in a variable storage region; and a third operation of defining transitions of the plural user interface screens that are designed. Further, as recited in claim 7, a tool conforming to a first standard may be applied as the first tool; more specifically, for example, as recited in claim 8, JSF may be applied as the first standard.

Further in the invention recited in claim 1, when a flowchart defining processing that provides a desired web service is created by a developer, the second tool generates the second program for executing the processing represented by the created flowchart. A tool conforming to a second standard (a different standard from the first tool) may be applied as the second tool; more specifically, for example, as recited in claim 8, BPEL may be applied as the second standard.

Here, the application development support device relating to the invention recited in claim 1 is a device that supports the development of an application program including the first program and the second program, which is performed by using the first tool and second tool described above. The symbol generation component generates an unconditional starting symbol to be used as a starting symbol that is usable as a structural element of the user interface screen and is for causing processing to be performed that calls the second program generated using the second tool and provides a predetermined web service. A third program is added to the unconditional starting symbol, which program unconditionally performs processing that causes the second program to be started and causes processing that provides the predetermined web service to be executed when, at a time of operation (for example, a time of execution of the first program by a computer or a time of provision of the user interface executed by the first program to a user), a user interface screen in which the starting symbol is located is called.

Here, for example, as recited in claim 3, this unconditional starting symbol may be used as a symbol that is directly called from a link (called without going through display of another user interface screen) by the link being selected, in which link information including address information (for example, a URL (Uniform Resource Locator) or the like) for calling a specific user interface screen is embedded, and that is for being located in the specific user interface screen, which displays a result of processing that provides a predetermined web service performed by the second program.

The unconditional starting symbol is usable as a structural element of a user interface screen. Thus, the unconditional starting symbol may be located in a user interface screen that is being designed, by a developer performing the first operation. When the user interface screen in which the unconditional starting symbol is located is called at a time of operation, the third program that has been added to the unconditional starting symbol is executed, processing that starts the second program and causes processing that provides a predetermined web service to be executed is unconditionally performed, and a result of execution of the predetermined web service is obtained.

Thus, in the invention recited in claim 1, an unconditional starting symbol is generated by the symbol generation component, to which a third program is added that unconditionally performs processing that starts a second program and causes processing that provides a predetermined web service to be executed when a user interface screen in which it is located is called at a time of operation. Thus, in development of an application program having a user interface that includes a specific user interface screen that is directly called from a link and displays a processing result of a specific web service, coding operations to create a program that starts the second program from the specific user interface screen and causes the processing that provides the predetermined web service to be executed may be omitted. Further, a developer may design this user interface screen to be capable of being directly called from a link simply by performing the first operation of locating the unconditional starting symbol displayed in the display screen by the first tool into the user interface screen, which displays a result of processing of the predetermined web service. Thus, there is no need to perform the aforementioned coding operation, in association with which a time required for operations to define a construction target user interface, and hence a development time of the application program, may be shortened.

In the invention recited in claim 1, an unconditional starting symbol may be a symbol that is visibly displayed on a user interface screen in which it is located at a time of operation. However, it is preferable if, for example, as recited in claim 2, the symbol generation component generates, as the unconditional starting symbol, a symbol for which a setting of attribute information has been performed such that the symbol is non-visibly displayed on the user interface screen in which it is located at a time of operation. Accordingly, a user interface screen in which the unconditional starting symbol is located may avoid becoming confused.

Further, in the invention recited in claim 1, the symbol generation component may, for example, as recited in claim 4, be structured by: a condition starting symbol generation component that, before at least the first operation is performed on the first tool, generates each of m types of condition starting symbol for calling any of n types of the second program generated using the second tool and causing mutually different processing of m types of processing that are executable by the n types of second program (m≧n) to be performed, which are usable as structural elements of the user interface screen; a program addition component that, for each of the m types of condition starting symbol, generates a fourth program that, when the specific symbol of the m types of condition starting symbol generated by the condition starting symbol generation component is selected in a state in which, at a time of operation, the specific symbol is visibly displayed on a user interface screen in which the specific symbol is located, causes a specific second program of the n types of second program, corresponding processing of which is executable, to be started and causes the corresponding processing to be executed, and adds the generated fourth program to the specific symbol; and a change component that if, when the first operation is being performed on the first tool, a change to an unconditional starting symbol is instructed for a specific condition starting symbol that is selected from the m types of condition starting symbol to which the fourth programs have been added by the program addition component and that is located in the user interface screen being designed, generates the unconditional starting symbol from the specific condition starting symbol located in the screen by changing the fourth program added to the specific condition starting symbol located in the screen to the third program that, when the user interface screen in which the symbol is located is called at a time of operation, unconditionally performs processing that causes the specific second program whose corresponding processing is executable to be started and causes the corresponding processing to be executed.

Accordingly, when a developer performs an operation defining a construction target user interface by using the first tool, a condition starting symbol generated by the condition starting symbol generation component of the symbol generation component is also displayed in the display screen by the first tool as a symbol that is usable as a structural element of the user interface screen, and a desired starting symbol of the displayed condition starting symbols (a condition starting symbol corresponding to processing whose execution is desired among the m types of processing) may be located into a user interface screen that is being designed by the first operation. Further, in a state in which the above-mentioned user interface screen is displayed at a time of operation, when a user selects the above-mentioned condition starting symbol, the fourth program added to this starting symbol is executed and the specific second program capable of executing the corresponding processing is started and the corresponding processing is performed. Therefore, according to the invention recited in claim 4, even if a user interface that the development target application program has includes a user interface screen in which a condition starting symbol that causes the second program to be started and the corresponding processing to be executed when selected is located in the screen, coding operations may be omitted.

Further, when the first operation is being performed on the first tool, if the developer selects a specific condition starting symbol from among the m types of condition starting symbol generated by the condition starting symbol generation component and locates the same in the user interface screen that is being designed, and performs an operation instructing a change of the specific condition starting symbol located in the screen to an unconditional starting symbol, then the specific condition starting symbol located in this screen is changed to an unconditional starting symbol. Thus, generation of an unconditional starting symbol that causes desired processing of the m types of processing to be executed by the second program may be realized by means of a simple operation.

Further, in the invention recited in claim 4, the first tool may be a tool that generates the first program for realizing the user interface when the construction target user interface is defined by a second operation and a third operation being performed by a developer in addition to the first operation, the second operation relating each individual information input/display space located in the user interface screen designed by the first operation with a storage region of a corresponding variable among plural variables for which storage regions are provided in a variable storage region, and the third operation defining transitions of a plural number of user interface screens that are designed. In this case, for example, as recited in claim 5, it may be structured such that a variable storage region generation component is provided that, before the first to third operations are performed on the first tool, generates as the variable storage region, on the basis of variable definition information that respectively define input variables and output variables of the m types of processing that are executable by the n types of the second program generated using the second tool (m≧n), a variable storage region in which storage regions of the variables defined by the variable definition information are respectively provided and storage regions of variables that are duplicatively defined by the variable definition information are shared, and the program addition component generates, as the fourth program, a program that, when, at a time of operation, the specific condition starting symbol is selected in a state in which it is visibly displayed on a user interface screen in which it is located, causes, of the n types of second program, the specific second program whose corresponding processing is executable to be started and causes the corresponding processing to be executed, using data stored in a storage region, among the storage regions in the variable storage region, of a variable that corresponds to an input variable of the processing corresponding to the specific condition starting symbol as an argument, and, when execution of the corresponding processing by the specific second program ends, performs processing that stores an output variable handed from the specific second program in a storage region, among the storage regions in the variable storage region, of a variable that corresponds to the handed over output variable.

Accordingly, in a state in which a user interface screen in which a condition starting symbol is located in the screen is displayed, when a user selects the above-mentioned condition starting symbol, the fourth program added to this condition starting symbol is executed, and processing is performed that causes a specific second program capable of executing corresponding processing to be started and the corresponding program to be executed, using data stored in, among the storage regions in the variable storage region, a storage region of a variable corresponding to an input variable of the processing corresponding to the condition starting symbol as an attribute and that, when execution of the corresponding processing by the specific second program ends, stores an output variable handed from the specific second program in, among the storage regions in the variable storage region, a storage region of a variable corresponding to the handed over output variable.

In the invention recited in claim 5, the fourth program generated by the program addition component before the first to third operations are performed on the first tool is a program that, when a specific condition starting symbol displayed in a user interface screen is selected, causes a specific second program capable of executing corresponding processing among the n types of second program to be started and the corresponding processing to be executed, using data stored in, among the storage regions in the variable storage region, a storage region of a variable corresponding to an input variable of the processing corresponding to the specific condition starting symbol as an attribute and, when execution of the corresponding processing by the specific second program ends, stores an output variable handed from the specific second program in, among the storage regions in the variable storage region, a storage region of a variable corresponding to the handed over output variable. Processing target storage regions of the processing by the fourth program (storage regions whose stored data is used as an attribute or that store handed over output variables) are specified at the time of generation of the fourth program. Therefore, in the invention recited in claim 5, there is no need to perform search and extraction processing of processing target storage regions at the time of execution of the fourth program, and thus a processing time when the fourth program is executed may be reduced.

In the invention recited in claim 5, the variable storage region is generated by the variable storage region generation component, in which storage regions of the variables defined by the variable definition information are respectively provided and in which storage regions of variables that are duplicatively defined in the variable definition information are shared. Thus, even if for example, a user interface is constructed in which an output variable of first processing executed by a second program is displayed in a specific information input/display space in a user interface screen and alteration setting is performed by a user as necessary on the data displayed in the specific information input/display space (the output variable of the first processing) and the user interface uses the data in the specific information input/display space on which alteration setting has been performed as necessary as an input variable of second processing by the second program, or suchlike, then the number of storage regions in the variable storage region that need to be related with the above-mentioned specific information input/display space need only be one. Accordingly, in the first tool, even if the number of storage regions in the variable storage region that can be related with individual information input/display spaces is limited to one each, a user interface as described above may be constructed, and a degree of freedom of design of user interfaces to be realized by the first program may be improved.

In the invention recited in claim 5, as the first program generated by the first tool, for example, as recited in claim 6, a program is excellent in which the first program is executed on a computer that executes a predetermined program that functions as a platform for executing the first program and, at a time of execution of the first program by this computer, synchronized processing is performed by the predetermined program that, when information is newly inputted in a specific information input/display space that is located in a user interface screen displayed in a display screen and at which input of information is possible, stores the inputted information in a specific storage region, among the storage regions in the variable storage region, that is related with the specific information input/display space and, when the information is newly stored in the specific storage region in the variable storage region, causes the stored information to be displayed in a specific information input/display space that is located in a user interface screen displayed in the display screen, that is related with the specific storage region and at which display of information is possible.

An application development support program relating to the invention recited in claim 9 is a program for causing a computer to function as an application development support device that supports development of an application program including a first program and a second program, which is performed using a first tool that, when plural types of symbol that are usable as structural elements of a user interface screen are displayed at a display screen and a construction target user interface is defined by at least a first operation that designs a user interface screen being performed by a developer locating a desired symbol of the plural types of symbol at a desired position in a screen, generates the first program for realizing the user interface and a second tool that, when a flowchart that defines processing that provides a desired web service is created by a developer, generates the second program for executing the processing that the created flowchart represents, wherein the application development support program causes the computer to function as: a symbol generation component that generates, as a starting symbol that is usable as a structural element of the user interface screen and is for calling the second program generated using the second tool and causing processing that provides the predetermined web service to be performed, an unconditional starting symbol to which a third program is added that, when a user interface screen in which the unconditional starting symbol is located is called at a time of operation, unconditionally performs processing that causes the second program to be started and causes processing that provides the predetermined web service to be executed.

The application development support program relating to the invention recited in claim 9 is a program for causing the computer to function as the above-described symbol generation component. By the computer executing the application development support program relating to the invention recited in claim 9, the computer functions as the application development support device recited in claim 1. Similarly to the invention recited in claim 1, development of an application program that has a user interface including a user interface screen that is called by a link being selected and displays a processing result of a specific web service may be realized without a coding operation.

A storage medium relating to the invention recited in claim 10 is a storage medium storing an application development support program for causing a computer to function as an application development support device that supports development of an application program including a first program and a second program, which is performed using a first tool that, when plural types of symbol that are usable as structural elements of a user interface screen are displayed at a display screen and a construction target user interface is defined by at least a first operation that designs a user interface screen being performed by a developer locating a desired symbol of the plural types of symbol at a desired position in a screen, generates the first program for realizing the user interface and a second tool that, when a flowchart that defines processing that provides a desired web service is created by a developer, generates the second program for executing the processing that the created flowchart represents, wherein the application development support program causes the computer to function as: a symbol generation component that generates, as a starting symbol that is usable as a structural element of the user interface screen and is for calling the second program generated using the second tool and causing processing that provides the predetermined web service to be performed, an unconditional starting symbol to which a third program is added that, when a user interface screen in which the unconditional starting symbol is located is called at a time of operation, unconditionally performs processing that causes the second program to be started and causes processing that provides the predetermined web service to be executed.

The storage medium relating to the invention recited in claim 10 stores the application development support program relating to the invention recited in claim 9, that is, a program for causing a computer to function as the above-described symbol generation component. By the application development support program read from the storage medium relating to the invention recited in claim 10 being executed by the computer, this computer functions as the application development support device recited in claim 1. Similarly to the invention recited in claim 1, development of an application program that has a user interface including a user interface screen that is called by a link being selected and displays a processing result of a specific web service may be realized without a coding operation.

Effect of the Invention

The present invention as described above generates, as a starting symbol that is usable as a structural element of a user interface screen and is for causing processing that provides a predetermined web service to be executed, a symbol to which a third program is added that, when a user interface screen in which it is located is called at a time of operation, unconditionally performs processing that causes processing providing a predetermined web service to be executed. Thus, the present invention has an excellent effect in that development of an application program that has a user interface including a user interface screen that is called by a link being selected and displays a processing result of a specific web service may be realized without a coding operation.

BRIEF DESCRIPTION OF THE DRAWINGS

FIG. 9 is a conceptual diagram showing an example of a flow of processing when a web service is utilized from a link.

BEST MODE FOR CARRYING OUT THE INVENTION

Figure 1:
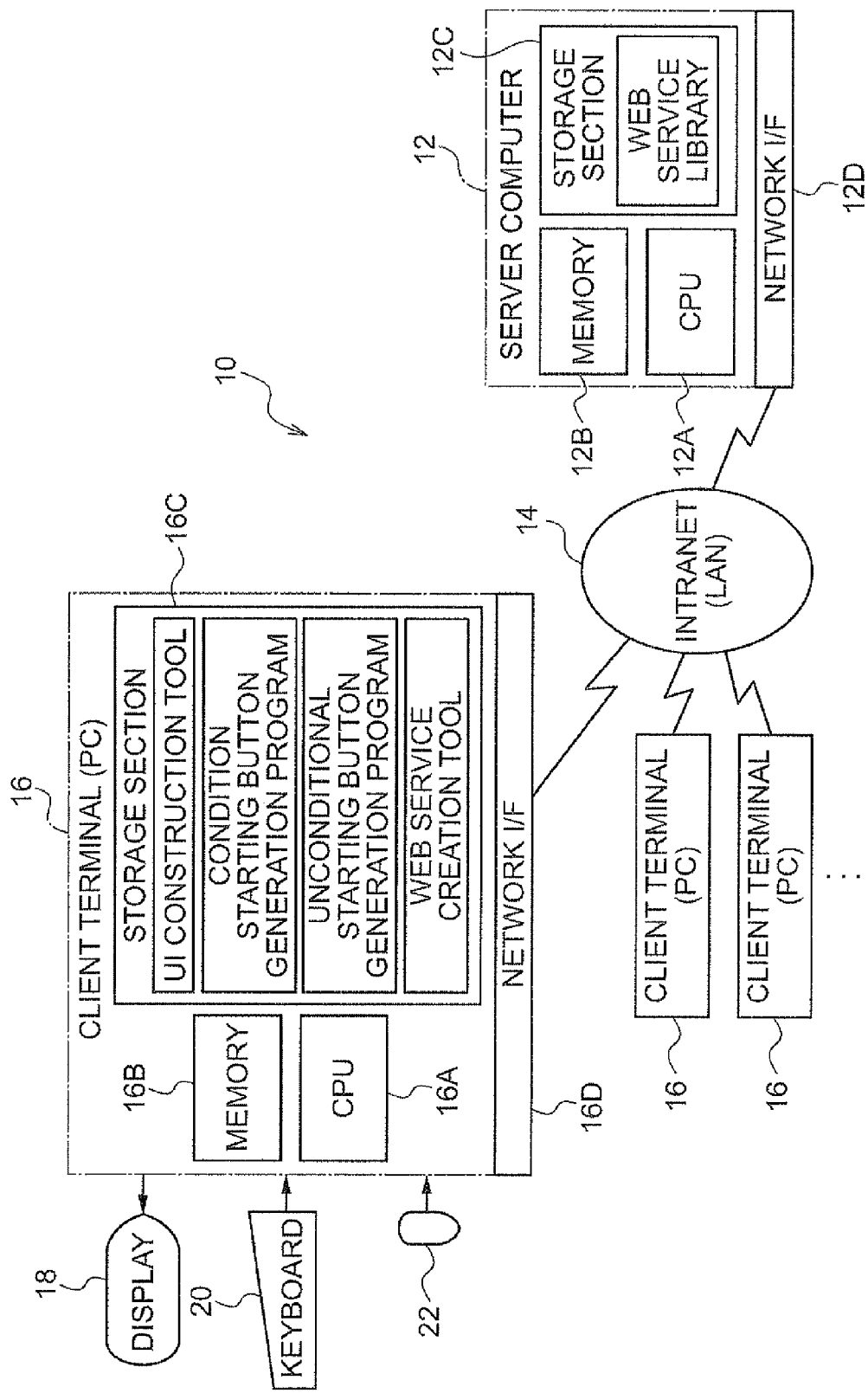
FIG. 1 is a block diagram showing schematic structure of a first computer system that is used as a development environment of an application program of a present exemplary embodiment.

Herebelow, an example of an embodiment of the present invention is described in detail referring to the drawings. FIG. 1 shows a first computer system 10 relating to the present exemplary embodiment. The first computer system 10 relating to the present exemplary embodiment is a computer system that is used when developing an application program for providing a predetermined service (a web service) to users accessing a predetermined website, and is structured by a server computer 12 being respectively connected with a large number of client terminals 16 via an intranet 14. An individual client terminal 16 is a terminal device operated by a developer who develops the above-mentioned application, is formed of, for example, a personal computer (PC) or the like, and is provided with a CPU 16A, a memory 16B formed of RAM or the like, a memory section 16C formed of an HDD (hard disk drive) or the like, and a network interface (I/F) section 16D. A display 18 to be used as a display component and a keyboard 20 and mouse 22 to be used as an input component are respectively connected to the individual client terminal 16, and the client terminal 16 is connected to the intranet 14 via the network I/F section 16D.

The above-mentioned application program is broadly divided into a screen control program for realizing user interface (UI) parts of the predetermined website (the first program of the present invention) and a web service provision program for providing the predetermined web service to users (the second program of the present invention). A UI construction tool program for developing the above-mentioned screen control program and a web service creation tool program for developing the above-mentioned web service provision program are respectively installed at the memory section 16C of the client terminal 16. Furthermore, a condition starting button generation program for performing later-described condition starting button generation processing and an unconditional starting button generation program for performing unconditional starting button generation processing are also installed at the client terminal 16. This condition starting button generation program and unconditional starting button generation program correspond to the application development support program recited in claim 9, and the client terminal 16 functions as the application development support device relating to the present invention, by the CPU 16A executing the condition starting symbol generation program and the unconditional starting symbol generation program.

Herein, the UI construction tool corresponds to the first tool relating to the present invention, and the web service creation tool corresponds to the second tool relating to the present invention. As the UI construction tool, a tool conforming to the JSF (Java (registered trademark) Server Faces) standard is excellent, but a tool conforming to another standard is also possible. As the web service creation tool, a tool conforming to the BPEL (Business Process Execution Language) is excellent, but a tool conforming to another standard is also possible.

Meanwhile, the server computer 12 is provided with a CPU 12A, a memory 12B formed of RAM or the like, a memory section 12C formed of an HDD or the like, and a network OF section 12D, and is connected to the intranet 14 via the network I/F section 12D. In development of web service provision programs using the above-mentioned web service creation tool, programs are developed using individual web services (for example, a later-described "book search", "book purchase" and the like) as units, and the developed web service provision programs may also be utilized for provision of the same web services at other websites. Therefore, a web service library for registering the developed web service provision programs is memorized in the memory section 12C of the server computer 12, and the web service provision programs registered in this web service library may be respectively used by plural developers operating different client terminals 16 from one another.

Figure 8:
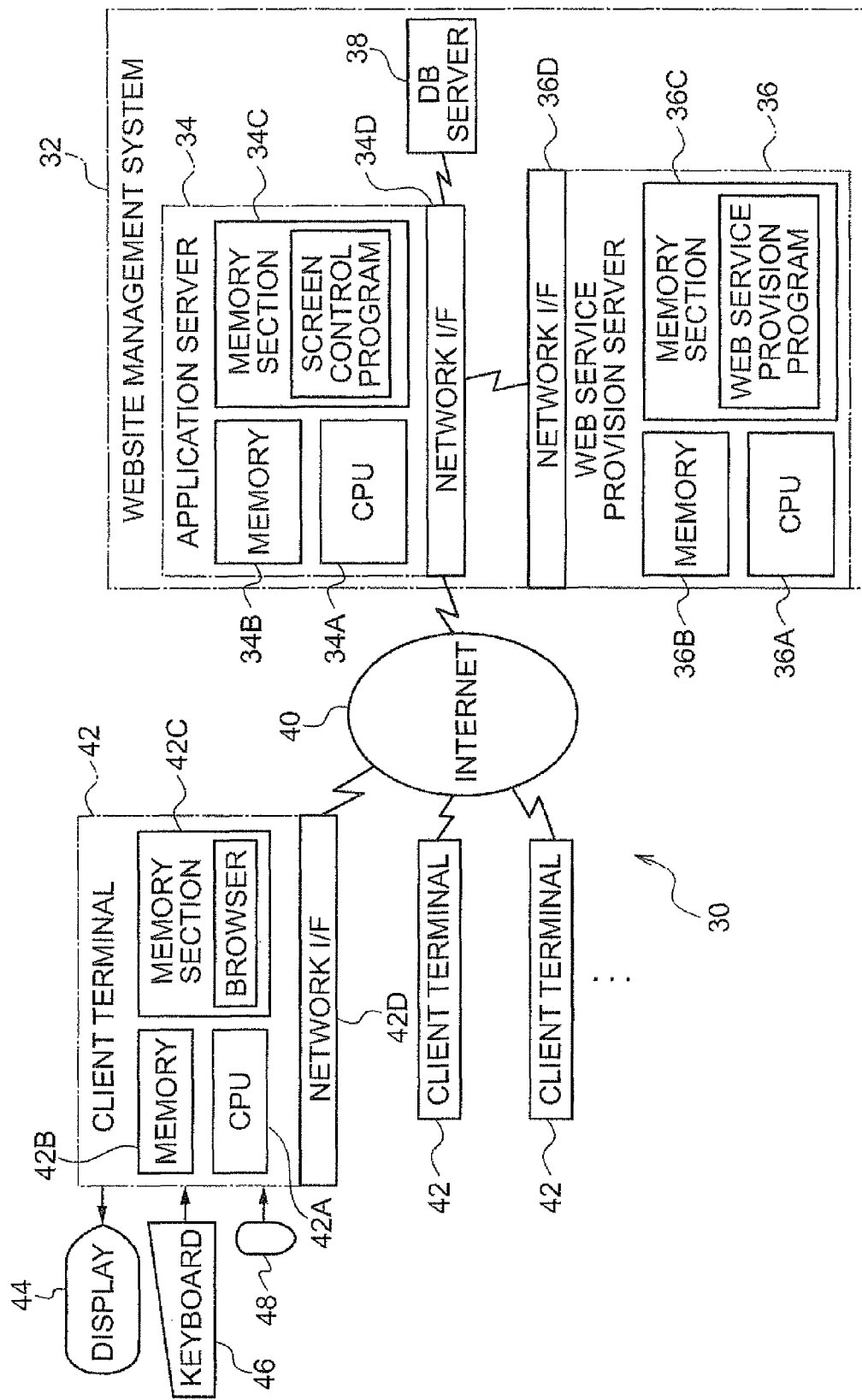
FIG. 8 is a block diagram showing schematic structure of a second computer system that is used as an execution environment of the application program.

Next, structure of a second computer system 30 that is used as an execution environment of the application program developed by means of the first computer system 10 will be described referring to FIG. 8. The second computer system 30 is provided with a website management system 32 for managing a specific site. The website management system 32 is provided with an application server 34, a web service provision server 36 and a DB (database) server 38, and is structured by the web service provision server 36 and the DB server 38 being respectively connected to the application server 34 via communications circuits.

The application server 34 is provided with a CPU 34A, a memory 34B formed of RAM or the like, a memory section 34C formed of an HDD or the like, and a network I/F section 34D. The aforementioned screen control program of the application program developed by utilizing the first computer system 10 described earlier is installed in the memory section 34C. The network I/F section 34D of the application server 34 is connected to a computer network (the Internet) 40 that is formed by a large number of web servers being connected to one another via communications circuits. A large number of client terminals 42 are connected to the Internet 40. A client terminal 42 is provided with a CPU 42A, a memory 42B formed of RAM or the like, a memory section 42C formed of an HDD or the like, and a network I/F section 42D. A browser (web viewing software) program is installed at the memory section 34C, and a display 44 to be used as a display component and a keyboard 46 and mouse 48 to be used as an input component are respectively connected to the client terminal 42.

The web service provision server 36 is provided with a CPU 36A, a memory 36B formed of RAM or the like, a memory section 36C formed of an HDD or the like, and a network I/F section 36D. The aforementioned web service provision program of the application program developed by utilizing the first computer system 10 described earlier is installed in the HDD 36C.

Figure 2:
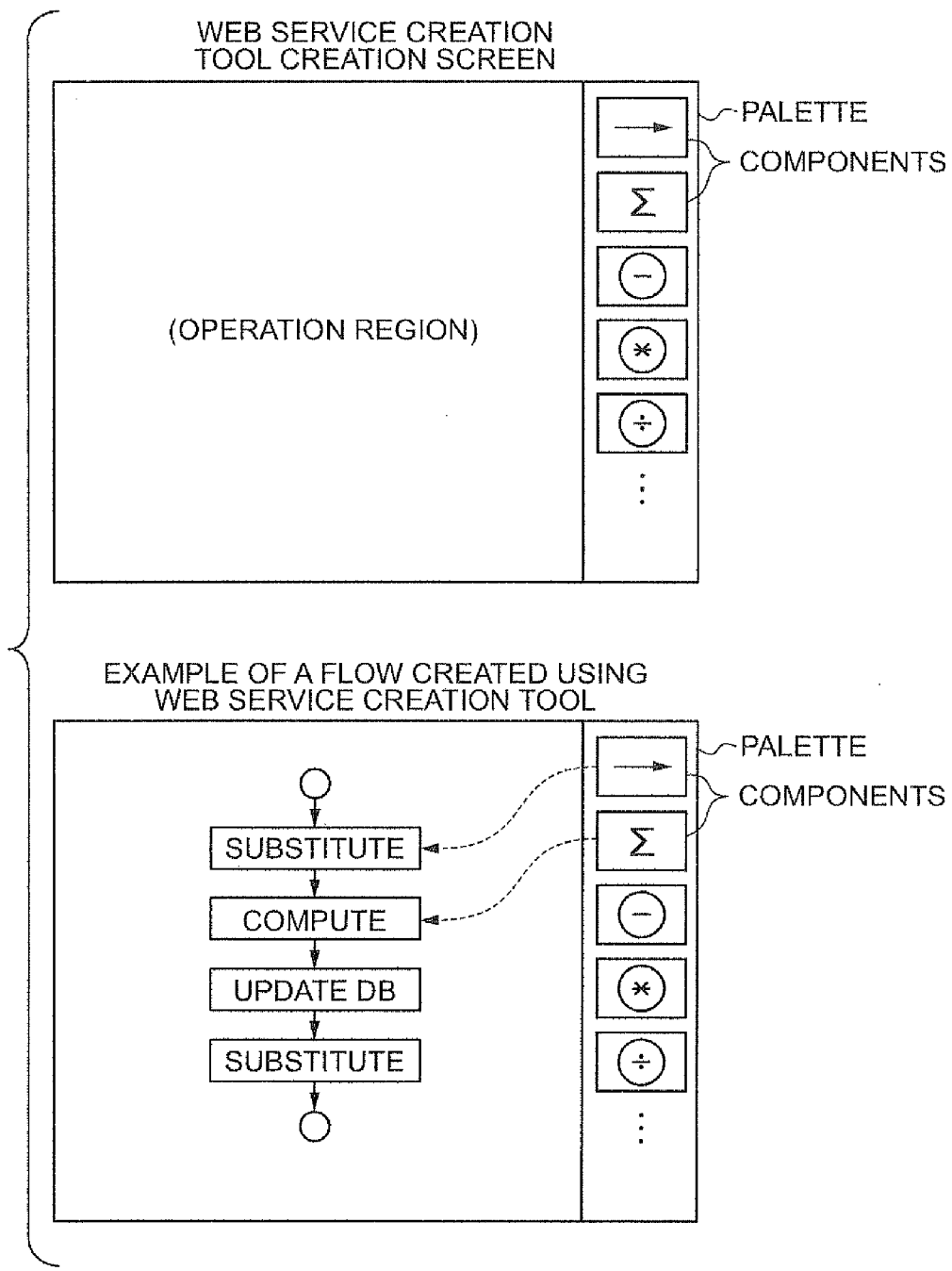
FIG. 2(A) is a conceptual diagram showing an example of a creation screen of a web service creation tool.
FIG. 2(B) is a conceptual diagram showing an example of a flow created on the creation screen by using the tool.

Next, as an operation of the present exemplary embodiment, firstly, development of a web service provision program that is performed by using the web service creation tool will be described. In order to develop the web service provision program, when a developer starts the web service creation tool program on the client terminal 16, a creation screen, for example, as shown in FIG. 2(A), is displayed at the display 18 of the client terminal 16. The web service creation tool is a tool that is provided with a function that, when a flowchart that defines processing that realizes a provision target web service is created by a developer, generates a web service provision program for executing the processing represented by the created flowchart. In the creation screen shown in FIG. 2(A), an operation region for the developer to create a flowchart and a palette are provided. The palette displays plural types of components (symbols) representing mutually different processes that may be utilized in creation of the flowchart.

When the above-described creation screen is displayed, the developer, via the mouse 22 and/or the keyboard 20, repeats operations that select desired components from among the plural components displayed in the palette and locate them in the operation region, input information that defines details of processing represented by the located components as necessary, and define connection relationships between the provided components and components previously located in the operation region (sequences of execution of the processing represented by the components). Thus, for example, as shown in FIG. 2(B), a flowchart that defines processing that realizes the provision target web service is created. When the creation of the flowchart finishes, the developer performs an operation to instruct the generation of a program corresponding to the created flowchart. Programs for realizing processes represented by the individual components have been added to the individual components displayed in the palette. When generation of the program is instructed, the web service creation tool modifies the programs added to the individual components that structure the created flowchart, on the basis of the information defining processing details that has been inputted by the developer, and performs processing of ordering and the like in accordance with the connection relationships of the individual components in the created flowchart. Thus, the web service creation tool generates the program for executing the processing represented by the created flowchart (the web service provision program). Accordingly, a developer may provide a web service provision program that provides a desired web service without coding operations.

Further, the web service creation tool generates variable definition information that describes names and the like of input variables and output variables for when the generated web service provision program is executed. More specifically, this variable definition information is generated using web services that are realized by web service provision programs as units. When, for example, a flowchart that realizes plural types of web service is created and web service provision programs that realize the plural types of web service are generated on the basis of this flowchart, for reasons of shared parts that are common to processing for realizing the individual web services being numerous or the like, plural variable definition information corresponding to web services that are different from one another among the plural types of web service, are respectively generated by the web service creation tool.

When a web service provision program that realizes plural types of web service is generated, a number of types n of the web service provision programs is less than a number of types m of the web services that are capable of being provided (n<m). However, when the individual web service providing programs are programs that each realize a single web service, the number of types n of the web service provision programs is the same as the number of types m of the web services that are capable of being provided (n=m). Herein, the above-described variable definition information is referred to in, for example, the BPEL standard as WSDL (Web Service Description Language). In the present exemplary embodiment, there is a development rule that consistent names should be used for individual variables. In web services using the same variable, regardless of the details of these web services, the variables that are defined in the corresponding variable definition information are given the same name.

When the generation of the web service provision program (s) and variable definition information(s) by the web service creation tool as described above finishes, the developer uploads the generated web service provision programs and variable definition information from the client terminal 16 to the server computer 12. The web service provision programs and variable definition information uploaded to the server computer 12 are registered in the web service library, and may be used by other developers.

Next, a preparation operation that a developer performs prior to performing development of the screen control program by using the UI construction tool is described. When developing a screen control program by using the UI construction tool, the developer lists all the web services that are planned to be provided to users through the UI that is to be realized by means of the screen control program to be developed thereafter, and acquires (memorizes in the memory 16A or the memory section 16A) the web service provision programs and variable definition information corresponding to the listed individual web services by, for example, downloading them from the web service library of the server computer 12 or, as necessary, starting the web service creation tool and generating the web service provision programs and variable definition information by means of the web service creation tool after performing the aforementioned flowchart creation operation, or the like. Then, for all the web services whose provision to users is planned, when the corresponding web service provision programs and variable definition information are acquired, the condition starting button generation program is started on the client terminal 16.

Figure 3:
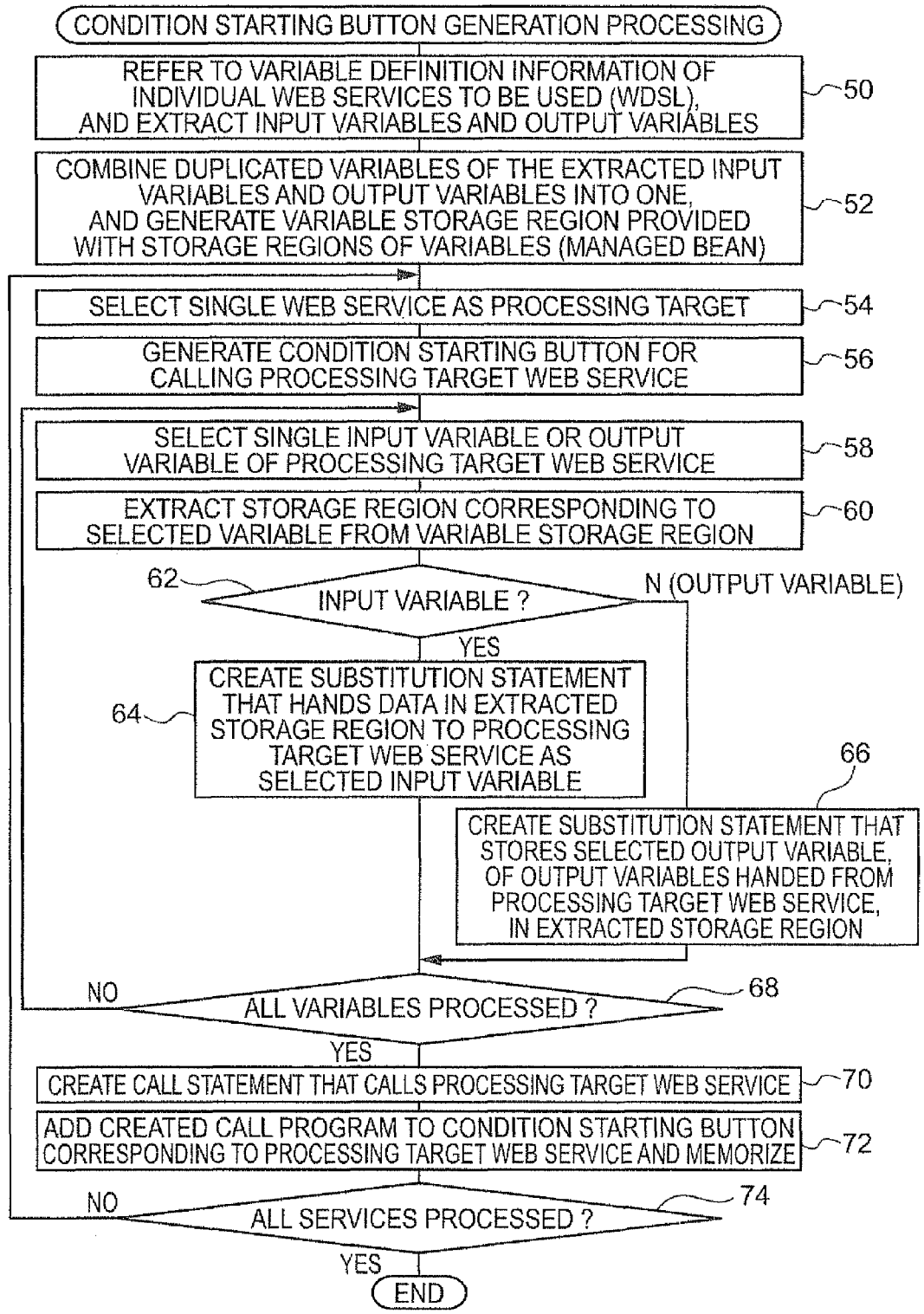
FIG. 3 is a flowchart showing details of condition starting button generation processing.

Herebelow, the condition starting button generation processing that is performed by the client terminal 16, by the started condition starting button generation program being executed by the CPU 16A, is described referring to FIG. 3. In the condition starting button generation processing, firstly, in step 50, the variable definition information (for example, WSDL with the BPEL standard) corresponding to the individual web services whose provision to users is planned, which have been memorized in the memory 16A or the memory section 16A, are each referred to and the input variables and output variables described by the individual variable definition information are all extracted. For example, if the number of types of web service whose provision to users is planned is m, input variables and output variables are extracted from m variable definition information. Then, in step 52, of the input variables and output variables extracted in step 50, duplicated variables (the names are the same and thus they are the same variable) are combined into one, and a variable storage region is generated in which storage regions of the variables are provided (for example, a managed bean with the JSF standard).

Figure 6:
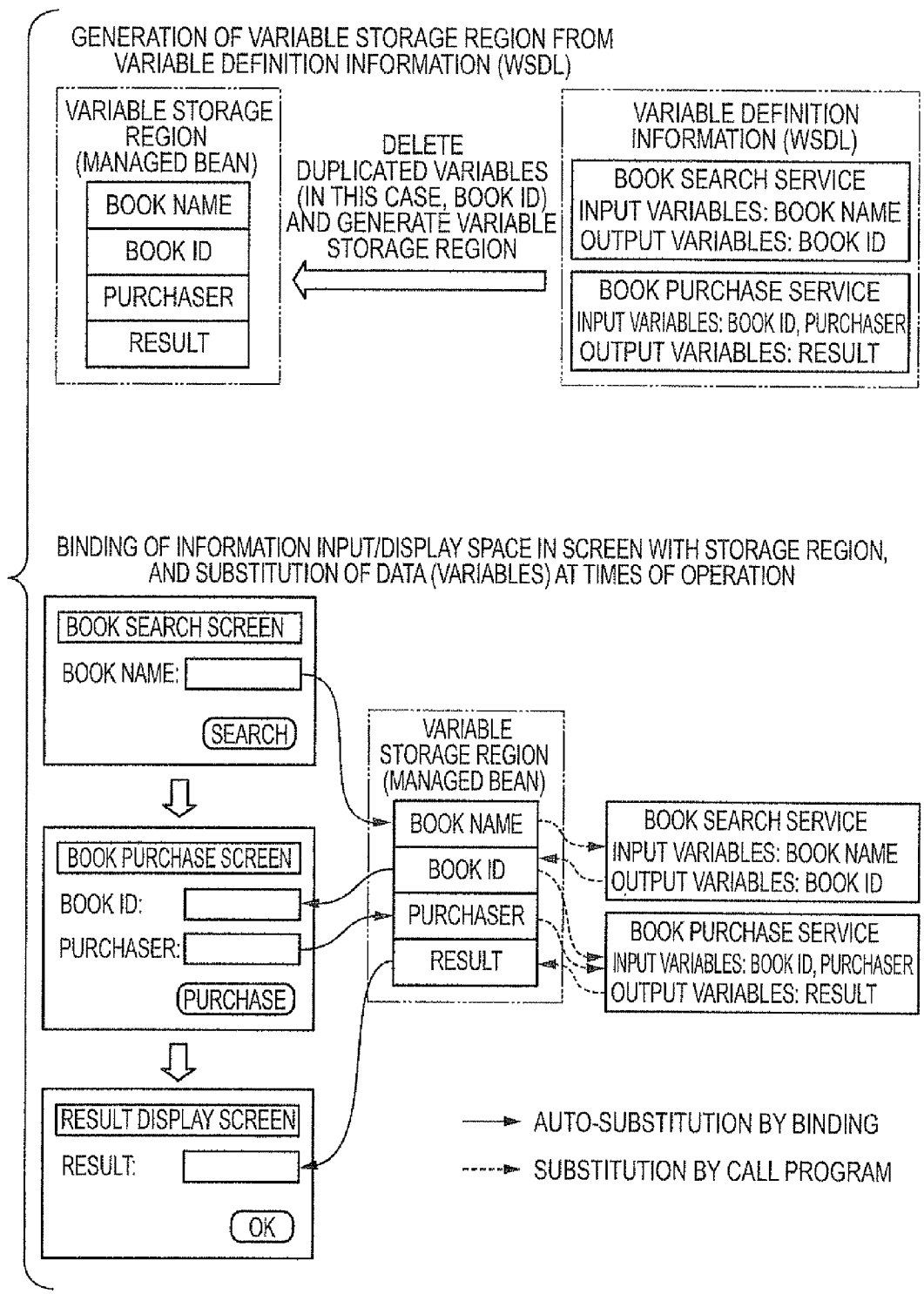
FIG. 6(A) is a conceptual diagram describing generation of a variable storage region from variable definition information.
FIG. 6(B) is a conceptual diagram describing binding between information input/display spaces in screens and storage regions, and substitution of data (variables) at a time of operation.

For example, as shown in FIG. 6(A), if the web services whose provision to users is planned are a Book Search Service and a Book Purchase Service, an input variable of the book search service is Book Name and an output variable is Book ID, and input variables of the Book Purchase Service are Book ID and Purchaser and an output variable is Result, then the duplicated Book ID is combined into one, and a variable storage region is generated in which storage regions are provided one each for the variables Book Name, Book ID, Purchaser and Result. Herein, steps 50 and 52 correspond to the variable storage region generation component recited in claim 5.

In step 54, a single web service is selected as a processing target from among the web services whose provision to users is planned. Then, in step 56, (information of) a condition starting button that will be visibly displayed on a UI screen at a time of operation and may, by selection, call the processing target web service on a web page is generated. As will be described in detail later, in the UI construction tool, symbols of information input/display spaces, various buttons and the like that are usable as structural elements in the UI screen are displayed in the palette of the creation screen (see FIG. 5), and the UI screen is designed by a developer, by the operation of selecting a desired symbol and locating it at a desired position being repeated. In step 56, (information of) the condition starting button conforming to the same standard as the UI construction tool (for example, JSF) is generated as the condition starting button that is visibly displayed on the UI screen at a time of operation and that may, by selection, call the processing target web service on the web page. Accordingly, the generated condition starting button may be displayed in the palette of the creation screen of the UI construction tool. Herein, step 56 corresponds to the condition starting symbol generation component recited in claim 4.

Next, processing from step 58 onward corresponds to the program addition component recited in claim 4. Firstly, in step 58, a single variable is selected from among the input variables and output variables described in the variable definition information corresponding to the processing target web service. Then, in step 60, the variable storage region generated in step 52 is searched, using the name of the variable selected in step 58 as a key, and the storage region corresponding to the variable selected in step 58 is extracted from the variable storage region. In step 62, it is determined whether or not the variable selected in step 58 is an input variable. If the determination is positive, control passes to step 64, and a substitution statement (program) is created that hands data stored in the storage region extracted from the variable storage region in step 60 to the processing target web service as the variable selected in step 58 (an input variable). If the variable selected in step 58 is an output variable, the determination of step 62 is negative, control passes to step 66, and a substitution statement (program) is created that, of output variables handed from the processing target web service at a time of ending of processing by the processing target web service, stores the output variable selected in step 58 in the storage region extracted from the variable storage region in step 60.

Then, in step 68, it is determined whether or not the above-described processing has been performed on all the variables described in the variable definition information corresponding to the processing target web service. If the determination is negative, control returns to step 58, and step 58 to step 68 are repeated until the determination of step 68 is positive. Accordingly, a program is automatically generated that, at a time of starting of (the program that provides) the processing target web service, performs processing that hands data corresponding to the input variables of the processing target web service from the variable storage region to the processing target web service as input variables (for example, see the rightward arrows shown by broken lines in FIG. 6(B)) and, at a time of ending of (the program that provides) the processing target web service, performs processing that stores output variables handed from the processing target web service in the variable storage region (for example, see the leftward arrows shown by broken lines in FIG. 6(B)).

If the determination of step 68 is positive, control passes to step 70, and a call statement (program) that calls the processing target web service is created. Then, in step 72, the call program created in the above-described processing (a program including the substitution statements created in steps 64 and 66 and the call statement created in step 70, corresponding to the fourth program recited in claim 4) is added to (information of) the button corresponding to the processing target web service, which was earlier created in step 56, and memorizes the same in a predetermined memory region of the memory 16B or the memory section 16C. Then, in step 74, it is determined whether or not the above-described processing has been performed for all the web services whose provision to users is planned. If the determination is negative, control returns to step 54, and step 54 to step 74 are repeated until the determination of step 74 is positive. Accordingly, (information of) buttons to which the above-mentioned call programs are added are respectively generated for all of the web services whose provision to users is planned. Then, when the determination of step 74 is positive, the condition starting button generation processing ends.

Figure 5:
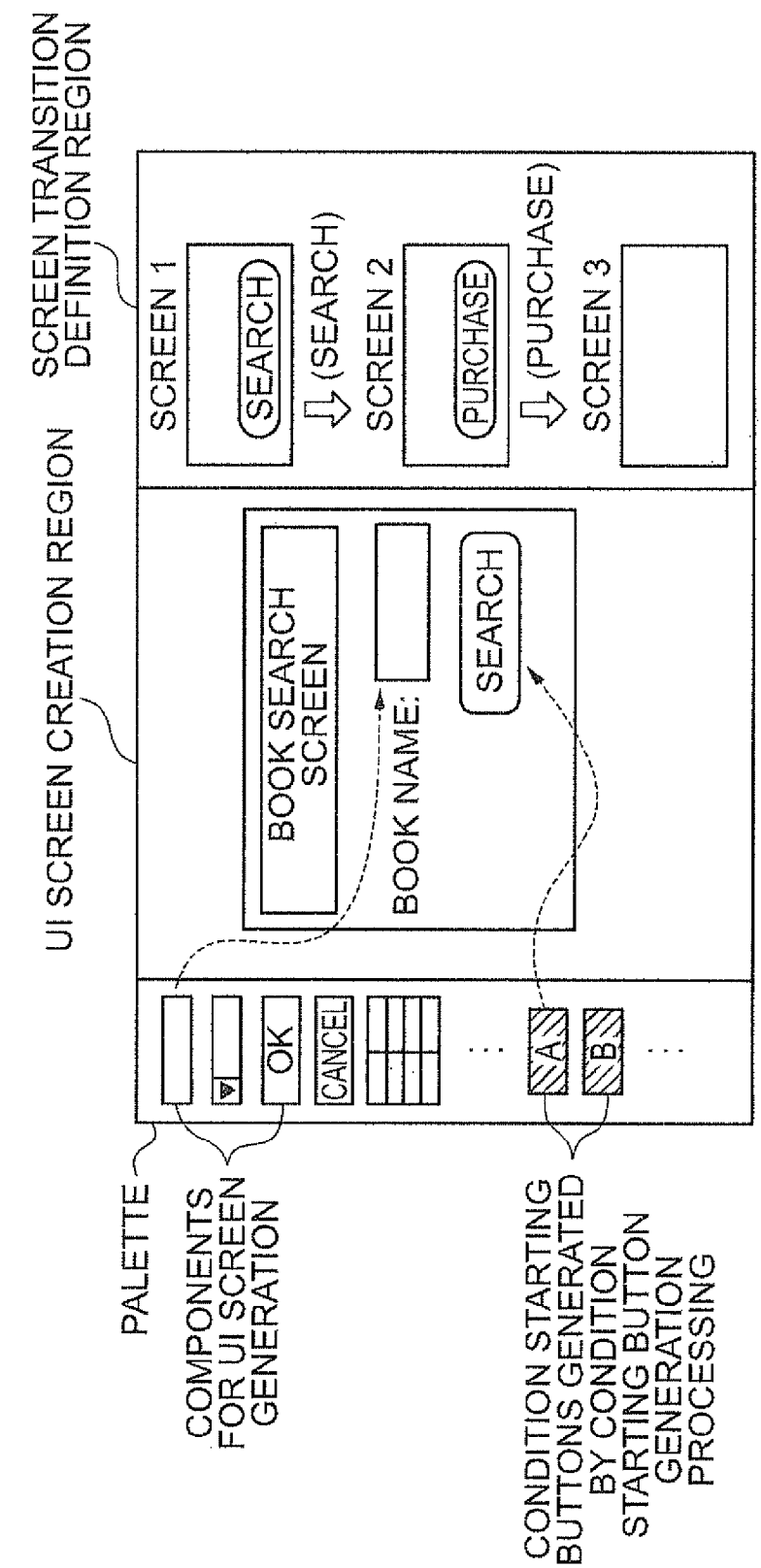
FIG. 5 is a conceptual diagram showing an example of a creation screen of a UI construction tool.

Then a developer starts the UI construction tool program on the client terminal 16. Accordingly, a creation screen, for example, as shown in FIG. 5, is displayed at the display 18 of the client terminal 16. The UI construction tool is a tool provided with functions that allow the developer to perform operations for constructing a UI and, when operations by the developer are finished, generate a screen control program that realizes the constructed UI. The creation screen shown in FIG. 5 is respectively provided with a UI screen creation region for the developer to create the UI screen (web page), a palette showing symbols of information input/display spaces, various buttons and the like that are usable as structural elements of the UI screen, and a screen transition definition region for defining transitions between plural UI screens created in the UI screen creation region. In the present exemplary embodiment, the above-described condition starting button generation processing is executed prior to starting the UI construction tool. Thus, at the time of starting of the UI construction tool, information of a condition starting button generated by the condition starting button generation processing and stored in a predetermined memory region is read, and for example, as shown in FIG. 5, the condition starting button generated by the condition starting button generation processing (a button for calling an individual web service whose provision to users is planned) is displayed in the palette as one of the symbols that are usable in creation of the UI screen.

When the preparation operation as described above ends, the developer then performs an operation for defining the construction target UI. Thus, construction of a UI of a predetermined website that provides a web service (development of a screen control program) is performed. That is, the developer repeats an operation (the first operation) of, via the mouse 22 and/or the keyboard 20, selecting a desired symbol from among the plural symbols displayed in the palette and locating it at a desired position in the UI screen creation region and, as necessary, inputting text information to be displayed in the UI screen. Thus, plural UI screens (web pages) that structure a predetermined website are sequentially created (designed). Herein, in the creation of an individual UI screen, when the UI screen to be created is a screen that motivates the provision of a specific web service to a user, the developer performs an operation of selecting the condition starting button for calling the specific web service from among the symbols displayed in the palette and locating this button in the UI screen.

Now, if a specific UI screen that has screen content displaying a processing result of a specific web service and that is capable, by a link in which link information is embedded being selected, of being directly called from the link (hereinafter this screen is referred to as a link call UI screen) is to be included in the construction target UI, then the developer, at the time of creation of the link call UI screen, performs an operation to instruct that a condition starting button temporarily located in the UI screen under construction be converted for unconditional starting (changed to an unconditional starting button).

Figure 4:
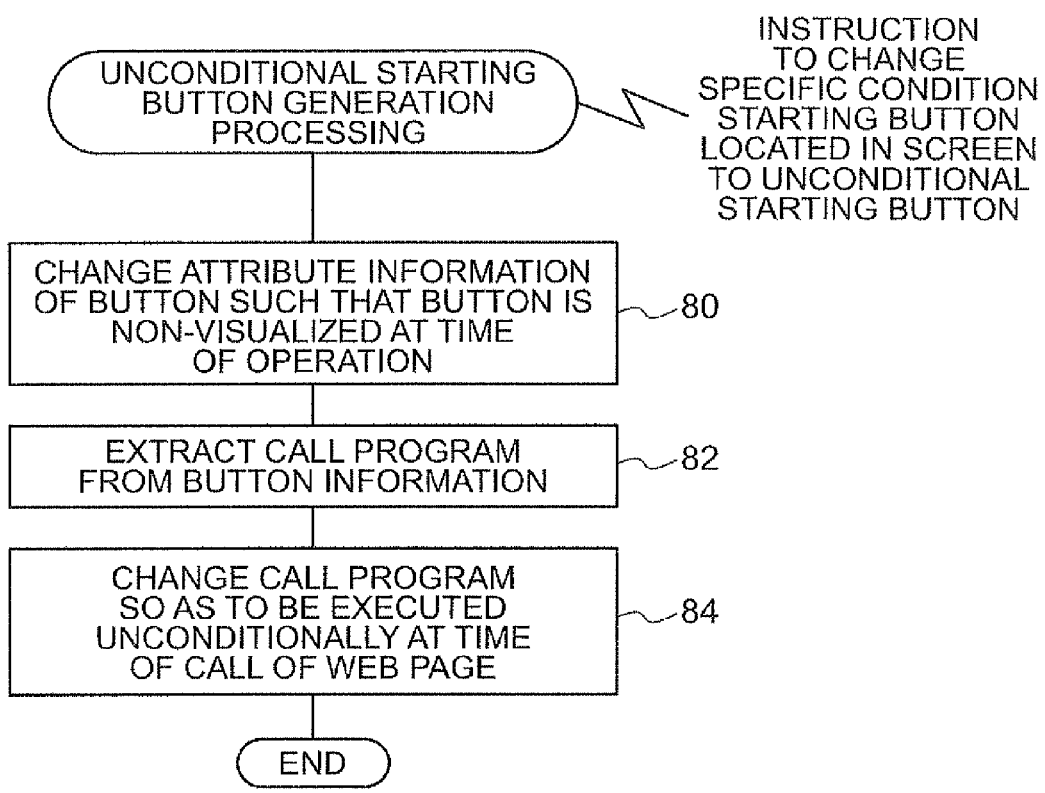
FIG. 4 is a flowchart showing details of unconditional starting button generation processing.

This operation is constituted by, for example: selecting the specific condition starting button, which corresponds to the specific web service whose processing result is displayed in the link call UI screen, from the plural condition starting buttons previously generated by the condition starting button generation processing and displayed in the palette of the creation screen; performing an operation to temporarily locate the selected specific condition starting button at a desired position in the UI screen under construction; thereafter performing an operation that causes properties (attribute info in ration) of the specific condition starting button located in the UI screen under construction to be displayed; and then performing an operation that turns on a function, in the displayed attribute information of the specific condition starting button, that causes the call program that is called by the UI screen to be executed unconditionally (in the present exemplary embodiment, this function is referred to as the SubmitOnLoad function). Accordingly, the unconditional starting button generation program is started on the client terminal 16, and the started condition starting button generation program is executed by the CPU 16A. Thus, the unconditional starting button generation processing shown in FIG. 4 is executed.

In this unconditional starting button generation processing, firstly, in step 80, information of the specific condition starting button located in the link call UI screen (the condition starting button for which turning on the SubmitOnLoad function has been instructed) is read from the memory 16B or the memory section 16C. Of the button information that is read, attribute information of the button (specifically, information defining display colors of the button) is changed (to transparent) such that the button that has been converted for unconditional starting is non-visualized in the link call UI screen. In step 82, a call program generated previously by the condition starting button generation processing is extracted from the button information that has been read.

The call program extracted in step 82 is executed and performs processing that calls a corresponding web service or the like when, at a time of operation (a time of execution of the developed application program), the UI screen in which the corresponding condition starting button is located is called from the client terminal 42 and displayed at the display 44 of the client terminal 42 and then the condition starting button that is visibly displayed in the displayed UI screen is selected. Next, in step 84, the call program extracted in step 82 is changed such that the call program will be executed unconditionally (without going through a button selection operation) when the UI screen in which the unconditional starting button is located (the link call UI screen) is called by a link being selected or the like, and the unconditional starting button generation processing ends. Herein, the processing of step 84 may be performed by, for example, deleting from the call program a determination statement (program) that determines whether or not a button selection operation has been performed, or the like.

When the above-described unconditional starting button generation processing ends, the condition starting button displayed in the UI screen under construction is converted for unconditional starting (is changed to an unconditional starting button). In association with the previous change of the attribute information in step 80, the display in the UI screen under construction is changed from a visible display to a non-visible display (is made transparent). Further, in association with the change of the condition starting button provided in the UI screen under construction to the unconditional starting button, the UI screen under construction is changed to a UI screen that calls a specific web service by the call program that has been added to the unconditional starting button in the screen being unconditionally executed at the application server 34 when the UI screen is directly called from a link and that, when processing corresponding to the specific web service ends, displays a processing result of the specific web service, that is, to a link call UI screen.

Thus, the developer may generate the unconditional starting button (change the UI screen under construction to a link call UI screen) without a coding operation, by simple operations of the form of locating the condition starting button in the UI screen under construction and instructing that properties of the located condition starting button be displayed and the SubmitOnLoad function be turned on. Herein, the call program that has been through the above-described unconditional starting button generation processing corresponds to the third program relating to the present invention. Further, the above-described unconditional starting button generation processing, together with the previously described condition starting button generation processing, corresponds to the symbol generation component relating to the present invention, and the unconditional starting button generation processing particularly corresponds to the change component recited in claim 4.

Further, if the created UI screen is a screen in which an information input/display space for input of information by a user or display of information is provided, the developer performs an operation (the second operation) that relates the individual information input/display space in the screen with, of the variable storage region previously generated by means of the button generation processing, a storage region corresponding to information that is inputted via the information input/display space or displayed at the information input/display space (also known as UI binding). Further, when all the UI screens (web pages) structuring a website have been created, the developer performs an operation (the third operation) that defines transitions of the created UI screens in the screen transition definition region.

If a concrete example of operation by a developer is described—in a case in which, as shown in FIG. 6(B), programs of a book search service and a book purchase service have already been developed to be used as programs of web services whose provision to users through a development target website is planned and, as a UI of this website, a UI is constructed that sequentially transitions to: a book search screen for a user to input a search target book name and instruct a search; a book purchase screen for the user to check a book ID extracted by the above-mentioned search, alter the book ID as necessary, and then input purchaser information and instruct a purchase; and a result display screen for the user to check a result of purchase processing—the developer, for the book search screen, creates the book search screen by performing operations to respectively locate in the screen an information input/display space for inputting the book name and a condition starting button for calling the book search service, and performs an operation to relate the information input/display space in the book search screen with a book name storage region in the variable storage region.

Further, the developer, for the book purchase screen, creates the book purchase screen by performing operations to respectively locate in the screen an information input/display space for performing display and input of a book ID, an information input/display space for inputting information of a purchaser, and a condition starting button for calling the book purchase service, and performs operations to relate the information input/display space for performing display and input of a book ID in the book purchase screen with the book ID storage region in the variable storage region, and also relate the information input/display space for inputting purchaser information with a purchaser information storage region in the variable storage region. The developer further creates the result display screen by performing operations to respectively locate in the screen an information input/display space for displaying result information and a button for instructing deletion of the screen (the button marked "OK" shown in FIG. 6(B)), and performs an operation to relate the information input/display space in the result display screen with a result information storage region in the variable storage region.

The developer may further perform operations that define transitions of the screens, so as to, from the state in which the book search screen is displayed, transition from the book search screen to the book purchase screen when the condition starting button in this screen is selected, and from the state in which the book purchase screen is displayed, transition from the book purchase screen to the result display screen when the condition starting button in this screen is selected. By the above-described operations, the UI shown in FIG. 6(B) may be defined.

Figure 7:
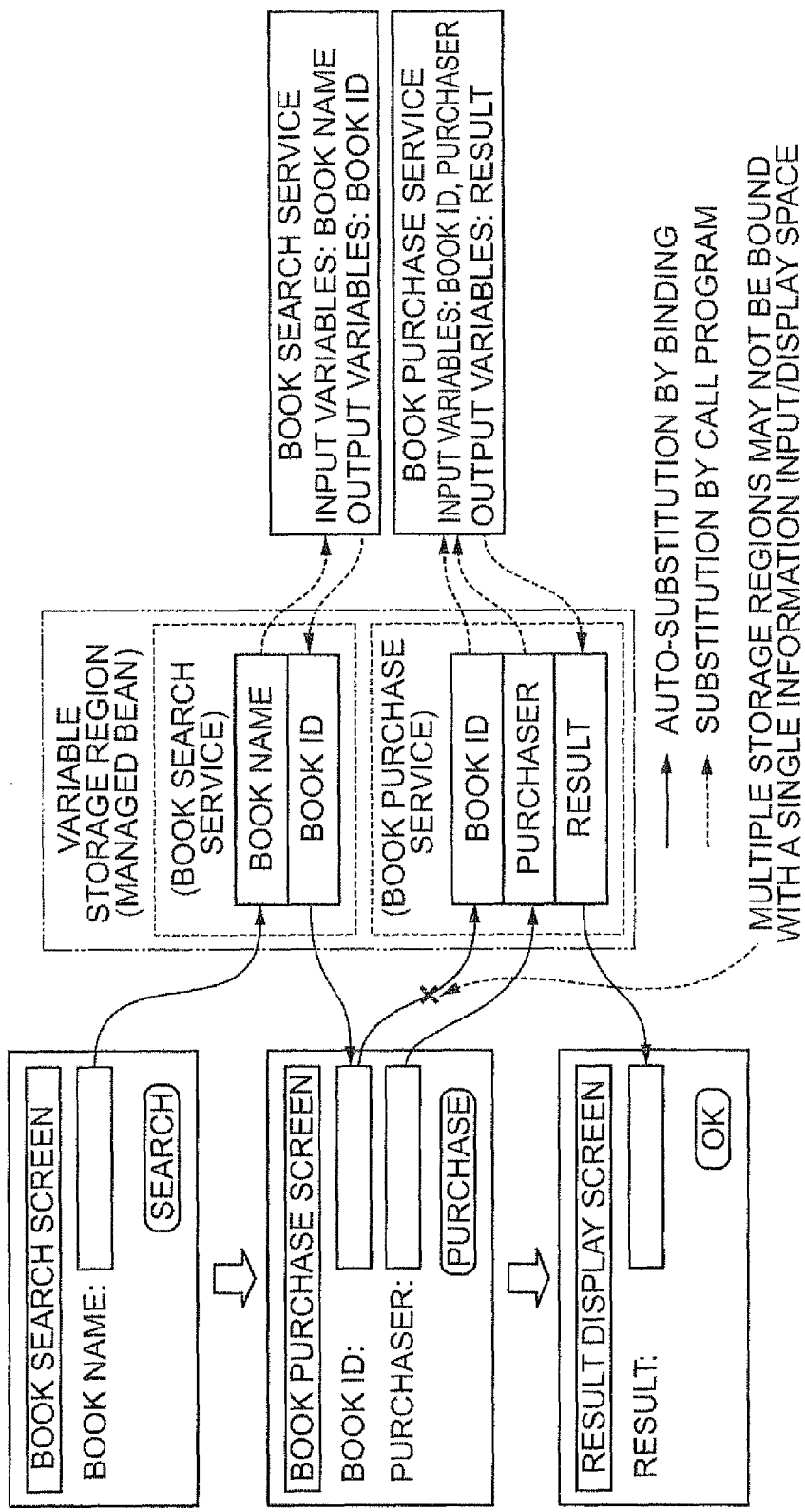
FIG. 7 is a conceptual diagram showing a problem when the same processing as in FIG. 6(B) is performed by a conventional method.

Now, if the UI described above were to be constructed in a conventional system provided with a variable storage region in which the individual web services whose provision to users is planned are units, then, for example, as shown in FIG. 7, the information input/display space for performing display and input of a book ID that is provided in the book purchase screen must be related respectively with a book ID storage region in a variable storage region that corresponds to the book search service and a book ID storage region in a variable storage region that corresponds to the book purchase service. However, with a standard such as JSF or the like to which the UI construction tool conforms, the numbers of storage regions in the variable storage region that may be related with the individual information input/display spaces are limited to one each, and the information input/display space in the book purchase screen for display and input of the book ID may not be related with plural storage regions as described above. Thus, the UI as shown in FIG. 6(B) may not be constructed. In contrast, in the present exemplary embodiment, in the condition starting button generation processing described previously, the variable storage region is generated with the storage region of a variable that is duplicatively defined in the variable definition information being shared. Thus, the UI shown in FIG. 6(B) may be constructed, in which, as shown in FIG. 6(B), the information input/display space in the book purchase screen for display and input of the book ID is only related with a single storage region, and a degree of freedom of design of UIs that may be realized may be improved.

Further, although construction of a UI that includes ordinary UI screens in which condition starting buttons are located is described above, a link call UI screen is also provided with an information input/display space for displaying a processing result of a web service, and at least an operation of relating the provided information input/display space with a storage region at which the processing result of the web service is stored (the second operation) is performed. In addition to an unconditional starting button in the link call UI screen, a condition starting button may be further located therein by performing the first operation, and an operation that defines a transition from the link call UI screen, when transitioning to another UI screen motivated by the condition starting button located in the link call UI screen being selected, in the screen transition definition region (the third operation) is also performed.

When operations to define the UI are finished, the developer instructs the UI construction tool to generate a program that realizes the UI. Accordingly, the UI construction tool generates a screen control program that realizes the UI constructed by the developer (causes the UI screens to be displayed in sequence at the display 44 of the client terminal 42 in response to requests from the client terminal 42 (see FIG. 8)). This screen control program is structured to include data that defines the individual UI screens and programs that define processing when various operations are performed via the individual UI screens by users. For UI screens that are provided with condition starting buttons for calling the various web services, the call programs that have been generated by the previously described condition starting button generation processing and added to the condition starting buttons are read, and the call programs that are read are used as programs that define processing when the condition starting buttons are selected by users (are incorporated into the screen control program). For link call UI screens in which unconditional starting buttons are provided, the call programs that have been changed by the previously described unconditional starting button generation processing and added to the unconditional starting buttons are used as programs that define processing that is performed unconditionally when the link call UI screens are called from links (are incorporated into the screen control program).

By the operations and processing described above, development of an application program including a screen control program and a web service provision program is completed. Thus, in the present exemplary embodiment, a web service provision program may be developed without a coding operation by utilizing the web service creation tool. For the screen control program, condition starting button generation processing is performed beforehand, the variable storage region is generated with storage regions of variables that are duplicatively defined—in the variable definition information of the individual web services whose provision to users is planned—being shared, and condition starting buttons are generated to which are added call programs that call the individual web services whose provision to users is planned. Thus, a developer may construct a desired UI (develop the screen control program) without performing a coding operation, by utilizing the UI construction tool and performing various operations including operations of locating the condition starting buttons displayed in the palette of the creation screen of the UI construction tool into the screens.

Even if a link call UI screen is included in the construction target UI, a developer may realize construction of the UI including the link call UI screen without performing a coding operation, by selecting a specific condition starting button corresponding to a specific web service whose processing result is displayed in the link call UI screen, locating the selected condition starting button in the UI screen that is under construction, changing the condition starting button located in the UI screen under construction to an unconditional starting button upon performing an operation on the condition starting button located in the UI screen under construction that turns on the SubmitOnLoad function, and making the UI screen under construction a link call UI screen. Therefore, the application program including the screen control program and the web service provision program may be developed in a very short time.

Next, operations at a time of execution of the application program (a time of operation of the website) are described. At the time of execution of the application program, as shown in FIG. 8, of the developed application program, the screen control program is installed at the memory section 34C of the application server 34 and the web service provision program is installed at the memory section 36C of the web service provision server 36.

Herein, although not described, a predetermined program (hereinafter referred to as a platform program) that functions as a platform for executing the screen control program is executed at the application server 34, and the screen control program is executed on this platform (for example, if the UI construction tool conforms to the JSF standard, the screen control program generated by the UI construction tool is executed on a platform referred to as a JSF engine). Further, a predetermined program that functions as a platform for executing the web service provision program is executed at the web service provision server 36, and the web service provision program is executed on this platform (for example, if the web service creation tool conforms to the BPEL standard, the web service provision program generated by the web service creation tool is executed on a platform referred to as a BPEL engine).

Each time distribution of a UI screen is requested by a user via the client terminal 42, the screen control program that is executed at the application server 34 sends data of the UI screen whose distribution has been requested to the request source client terminal 42. Thus, the UI screen whose distribution has been requested is displayed at the display 44 of the request source client terminal 42. Information that is inputted in an information input/display space in a UI screen displayed at the display 44, by the user operating the keyboard 46 or the like, is temporarily stored at the memory 42B of the client terminal 42 or the like, and is then transferred to the application server 34 at a predetermined timing (for example, a timing when a condition starting button that is a trigger for transition to a next UI screen is selected, or the like).

When the application server 34 receives the information inputted in the information input/display space in the UI screen by the user from the client terminal 42, the platform program that is operating at the application server 34 stores the received information in, of the variable storage region provided in the memory 34B of the application server 34, a storage region that has been related in advance with the information input/display space at which the information was inputted (processing that corresponds to a rightward arrow of the solid line arrows marked "auto-substitution by binding" in FIG. 6(B), corresponding to the synchronized processing recited in claim 6).

When a condition starting button for calling an arbitrary web service in a UI screen is selected by a user, the program of the corresponding web service is started on the web service provision server 36 that provides the web service, by the call program that has been added to the selected condition starting button, and data in the storage region in the variable storage region of a variable that corresponds to an input variable of the started program (a pre-specified storage region) is read from the variable storage region and the data that is read is handed to the started program as an input variable (processing corresponding to a rightward arrow of the broken line arrows marked "substitution by call program" in FIG. 6(B)). Accordingly, processing for realizing the web service corresponding to the condition starting button selected by the user is executed at the web service provision server 36. Here, if the processing for realizing the web service includes access to a database, access to the database is realized by access to the database being instructed from the web service provision server 36 to the DB server 38 via the application server 34.

When the processing by the program started on the web service provision server 36 ends, data corresponding to an output variable is handed from the web service provision server 36 to the application server 34, and processing that stores the handed over data in the storage region in the variable storage region that corresponds to the output variable (a pre-specified storage region) is performed at the application server 34 by the call program (processing that corresponds to a leftward arrow of the broken line arrows marked "substitution by call program" in FIG. 6(B)). Further, if the storage region in which the data has been newly stored by the above processing is related with some information input/display space in the UI screen, processing is performed by the platform program operating on the application server 34 that causes the data newly stored in the above-mentioned storage region to be displayed in the related information input/display space in the UI screen (processing that corresponds to a leftward arrow of the solid line arrows marked "auto-substitution by binding" in FIG. 6(B), corresponding to the synchronized processing recited in claim 6). Accordingly, various web services are provided to users through the website.

When, for example, a website formed with the UI screens shown in FIG. 6(B) is accessed by a user, firstly, the book search screen is displayed at the display 44 of the client terminal 42 that the user is operating. After the user inputs a search target book name in the book name input/display space in the book search screen, when the user selects the condition starting button marked "Search" (a button for calling the book search service), the book name that has been inputted in the book name input/display space is temporarily stored in the book name storage region of the variable storage region by the platform program, after which it is handed to the book search service program that is started by the call program, as an input variable. The UI screen that is displayed at the display 44 of the client terminal 42 is switched to the book purchase screen in association with the condition starting button marked "Search" being selected, and a book ID used as an output variable of the book search service is temporarily stored in the book ID storage region of the variable storage region by the call program, after which it is displayed in the book ID input/display space in the book purchase screen by the platform program.

When the book purchase screen is displayed at the display 44, the user checks the book ID displayed in the book ID input/display space in this screen, inputs to overwrite the book ID as necessary, and inputs purchaser information in the purchaser information input/display space, and then selects the condition starting button marked "Purchase" (a button for calling the book purchase service). Accordingly, the purchase information inputted in the purchaser information input/display space is stored in the purchaser information storage region of the variable storage region by the platform program (if inputting to overwrite the book ID has been performed by the user, the overwritten inputted book ID is also stored in the corresponding storage region), after which the book ID and the purchaser information stored in the variable storage region are handed to the book purchase service program that is started by the call program as input variables. The UI screen displayed at the display 44 of the client terminal 42 is switched to the result display screen in association with the condition starting button marked "Purchase" being selected, and result information used as an output variable of the book purchase service is temporarily stored in the result information storage region of the variable storage region by the call program, after which it is displayed in the result information input/display space in the result display screen by the platform program.

Next, an operation when—from a state in which an arbitrary document is displayed at the display 44 of the client terminal 42, to which a link has been added in which link information including address information (a URL) of a link call UI screen is embedded—the link call UI screen is directly called by the above-mentioned link being selected is described. Here, the above-mentioned arbitrary document may be a document to which links may be added and may be any of various types of document that are capable of being displayed by any of various applications: For example, text documents, spreadsheets, presentation documents, e-mail documents, web pages and the like.

When a link call UI screen is directly called by a link being selected, processing that renders (generates) the link call UI screen is performed. In this processing, firstly, the call program that has been added to the unconditional starting button located in the link call UI screen that has been called is executed unconditionally at the application server 34, and processing that starts the program of the corresponding web service (for example, a web service that acquires list information or the like) on the web service provision server 36 is performed (step 110 in FIG. 9). The processing for realizing the corresponding web service is executed at the web service provision server 36 (step 116 in FIG. 9).

When the processing by the program that is started on the web service provision server 36 (for example, list acquisition processing) ends, information corresponding to a processing result (an output variable) is handed from the web service provision server 36 to the application server 34, and processing that stores the data handed over in the storage region corresponding to the output variable in the variable storage region is performed by the call program (step 110 in FIG. 9; see the broken line arrow marked "storage" in FIG. 9). The storage region in which the data is newly stored by the above processing has been related with the link call UI screen by the second operation performed by the developer at the time of UI construction, and processing that displays the data newly stored in this storage region in the related information input/display space in the link call UI screen is performed by the platform program operating at the application server 34 (see the solid line arrow marked "auto-substitution by binding" in FIG. 9).

Then, when generation of the link call UI screen in which the result of processing by the web service is displayed finishes, this link call UI screen is distributed to the client terminal 42 (step 114 in FIG. 9), and is displayed at the display 44 of the client terminal 42. Here, in the link call UI screen displayed at the 44 at this time, the unconditional starting button located in the link call UI screen is non-visibly displayed (displayed as a transparent button) in accordance with the attribute information of the button that has been changed by the unconditional starting button generation processing (see the "Acquire list" button displayed faintly in FIG. 9).

Herein, in the above descriptions a mode is described in which a screen control program corresponding to the first program relating to the present invention and a web service provision program corresponding to the second program relating to the present invention are executed at different computers (the application server 34 and the web service provision server 36). However, this is not to be limiting. The first program and the second program may be executed at the same computer.

Further, in the above descriptions a mode is described in which, after a condition starting button is temporarily generated, an unconditional starting button that starts the same web service unconditionally (when a link call UI screen is called) is generated by a change of information of the condition starting button, in which an operation is performed that turns on a SubmitOnLoad function of the generated condition starting button. However, this is not to be limiting. The generation of unconditional starting buttons may be performed separately from the generation of condition starting buttons.

Further again, in the above descriptions the unconditional starting buttons are described as being buttons that are non-visibly displayed (made transparent) in the link call UI screens. However, this is not to be limiting. An unconditional starting button may be visibly displayed in a link call UI screen.

Further yet, in the above descriptions a mode is described that provides a predetermined web service to a user accessing a web site (the application server 34) through the Internet 40. However, this is not to be limiting. A mode is also applicable that uses an intranet instead of the Internet 40 and provides a predetermined web service to a user capable of connecting to this intranet (for example, an employee of a specific corporation), or the like.

Further still, in the above descriptions a mode has been described in which the condition starting button generation program and the unconditional starting button generation program corresponding to the application development support program relating to the present invention are memorized in advance (installed) at the memory section 16C of the client terminal 16. However, the application development support program relating to the present invention may be provided in a mode of being stored at a storage medium such as a CD-ROM, a DVD ROM or the like. The storage medium of this mode corresponds to the storage medium recited in claim 10.

The invention claimed is:

1. An application development support device having a processor and a memory that supports development of an application program including a first program and a second program, which is performed using a first tool that, when a plurality of types of symbol that are usable as structural elements of a user interface screen are displayed at a display screen by a computer and a construction target user interface is defined by a first operation, a second operation and a third operation being performed by a developer, causes the first program for realizing the user interface to be generated by a computer, the first operation designing the user interface screen by locating a desired symbol of the plurality of types of symbol at a desired position in a screen, the second operation relating each individual information input/display space located in the user interface screen designed by the first operation with a storage region of a corresponding variable among a plurality of variables for which storage regions are provided in a variable storage region, and the third operation defining transitions of a plurality of user interface screens that are designed, and a second tool that, when a flowchart that defines processing that provides a desired web service is created by a developer, causes the second program for executing the processing that the created flowchart represents to be generated by a computer, the application development support device comprising:

a variable storage region generation component that, before the first to third operations are performed on the first tool, generates as the variable storage region, on the basis of variable definition information that respectively define input variables and output variables of m types of processing that are executable by n types of the second program generated using the second tool (m≧n), a variable storage region in which storage regions of the variables defined by the variable definition information are respectively provided and storage regions of variables that are duplicatively defined by the variable definition information are shared; and a symbol generation component that generates, as information of a starting symbol that is usable as a structural element of the user interface screen and is for calling the second program generated using the second tool and causing processing that provides the predetermined web service to be performed by a computer, information of an unconditional starting symbol to which a third program is added that, when a user interface screen in which the unconditional starting symbol is located is called at a time of operation, causes processing to be performed by a computer which processing causes the second program to be started and causes processing that provides the predetermined web service to be executed, wherein the symbol generation component is structured by:

a condition starting symbol generation component that, before at least the first operation is performed on the first tool, generates information of each of m types of condition starting symbol for calling any of the n types of second program generated using the second tool and causing mutually different processing of the m types of processing that are executable by the n types of second program (m≧n) to be performed, as symbols that are usable as structural elements of the user interface screen, where m and n are integers and n>0;

a program addition component that, for each of the m types of condition starting symbol, generates—as a fourth program that, when a specific symbol of the m types of condition starting symbol for which information is generated by the condition starting symbol generation component is selected in a state in which, at a time of operation, the specific symbol is visibly displayed on a user interface screen in which the specific symbol is located, causes a specific second program of the n types of second program, the corresponding processing of which is executable, to be started by a computer and causes the corresponding processing to be executed—a program that, when, at a time of operation, the specific condition starting symbol is selected in the state in which it is visibly displayed on the user interface screen in which it is located, causes, of the n types of second program, the specific second program whose corresponding processing is executable to be started by a computer and causes the corresponding processing to be executed, using data stored in a storage region, among the storage regions in the variable storage region, of a variable that corresponds to an input variable of the processing corresponding to the specific condition starting symbol as an argument, and, when execution of the corresponding processing by the specific second program ends, causes processing to be performed by a computer which processing stores an output variable handed from the specific second program in a storage region, among the storage regions in the variable storage region, of a variable corresponding to the handed over output variable, and adds the generated fourth program to the information of the specific symbol; and a change component that if, when the first operation is being performed on the first tool, a change to an unconditional starting symbol is instructed for a specific condition starting symbol that is selected from the information of the m types of condition starting symbol to which the fourth programs have been added by the program addition component and that is located in the user interface screen being designed, generates the unconditional starting symbol from the specific condition starting symbol located in the screen by changing the fourth program added to the information of the specific condition starting symbol located in the screen to the third program that, when the user interface screen in which the symbol is located is called at a time of operation, causes processing to be performed by a computer which processing causes the specific second program whose corresponding processing is executable to be started and causes the corresponding processing to be executed.

2. The application development support device recited in claim 1, wherein the symbol generation component generates, as the unconditional starting symbol, information of a symbol for which a setting of attribute information has been performed such that the symbol is non-visibly displayed on the user interface screen in which it is located at a time of operation.

3. The application development support device recited in claim 1, wherein the unconditional starting symbol is a symbol for locating in a specific user interface screen that is directly called from a link, in which link information including address information for calling the specific user interface screen is embedded, by the link being selected and that displays a result of processing that provides the predetermined web service performed by the second program.

4. The application development support device recited in claim 1, wherein the first program is executed on a computer that executes a predetermined program that functions as a platform for executing the first program and, at a time of execution of the first program by this computer, synchronized processing is performed by the predetermined program that, when information is newly inputted in a specific information input/display space that is located in a user interface screen displayed in a display screen and at which input of information is possible, stores the inputted information in a specific storage region, among the storage regions in the variable storage region, that is related with the specific information input/display space and, when the information is newly stored in the specific storage region in the variable storage region, causes the stored information to be displayed in a specific information input/display space that is located in a user interface screen displayed in the display screen, that is related with the specific storage region and at which display of information is possible.

5. The application development support device recited in claim 1, wherein the first tool is a tool that conforms to a first standard, and the second tool is a tool that conforms to a second standard and generates the second program for executing the processing that the created flowchart represents when the flowchart that defines the processing that provides the desired web service is created by a developer.

6. The application development support device recited in claim 5, wherein the first standard is JSF (Java Server Faces) and the second standard is BPEL (Business Process Execution Language).

7. A non-transitory storage medium storing an application development support program for causing a computer to function as an application development support device that supports development of an application program including a first program and a second program, which is performed using a first tool that, when a plurality of types of symbol that are usable as structural elements of a user interface screen are displayed at a display screen by a computer and a construction target user interface is defined by a first operation, a second operation and a third operation being performed by a developer, causes the first program for realizing the user interface to be generated by a computer, the first operation designing the user interface screen by locating a desired symbol of the plurality of types of symbol at a desired position in a screen, the second operation relating each individual information input/display space located in the user interface screen designed by the first operation with a storage region of a corresponding variable among a plurality of variables for which storage regions are provided in a variable storage region, and the third operation defining transitions of a plurality of user interface screens that are designed, and a second tool that, when a flowchart that defines processing that provides a desired web service is created by a developer, causes the second program for executing the processing that the created flowchart represents to be generated by a computer, wherein the application development support program causes the computer to function as:

a variable storage region generation component that, before the first to third operations are performed on the first tool, generates as the variable storage region, on the basis of variable definition information that respectively define input variables and output variables of m types of processing that are executable by n types of the second program generated using the second tool (m≧n), a variable storage region in which storage regions of the variables defined by the variable definition information are respectively provided and storage regions of variables that are duplicatively defined by the variable definition information are shared, where m and n are integers and n>0; and a symbol generation component that generates, as information of a starting symbol that is usable as a structural element of the user interface screen and is for calling the second program generated using the second tool and causing processing that provides the predetermined web service to be performed by a computer, information of an unconditional starting symbol to which a third program is added that, when a user interface screen in which the unconditional starting symbol is located is called at a time of operation, causes processing to be performed by a computer which processing causes the second program to be started and causes processing that provides the predetermined web service to be executed, the symbol generation component being structured by:

a condition starting symbol generation component that, before at least the first operation is performed on the first tool, generates information of each of m types of condition starting symbol for calling any of the n types of second program generated using the second tool and causing mutually different processing of the m types of processing that are executable by the n types of second program (m≧n) to be performed, as symbols that are usable as structural elements of the user interface screen;

a program addition component that, for each of the m types of condition starting symbol, generates—as a fourth program that, when a specific symbol of the m types of condition starting symbol for which information is generated by the condition starting symbol generation component is selected in a state in which, at a time of operation, the specific symbol is visibly displayed on a user interface screen in which the specific symbol is located, causes a specific second program of the n types of second program, the corresponding processing of which is executable, to be started by a computer and causes the corresponding processing to be executed—a program that, when, at a time of operation, the specific condition starting symbol is selected in the state in which it is visibly displayed on the user interface screen in which it is located, causes, of the n types of second program, the specific second program whose corresponding processing is executable to be started by a computer and causes the corresponding processing to be executed, using data stored in a storage region, among the storage regions in the variable storage region, of a variable that corresponds to an input variable of the processing corresponding to the specific condition starting symbol as an argument, and, when execution of the corresponding processing by the specific second program ends, causes processing to be performed by a computer which processing stores an output variable handed from the specific second program in a storage region, among the storage regions in the variable storage region, of a variable corresponding to the handed over output variable, and adds the generated fourth program to the information of the specific symbol; and a change component that if, when the first operation is being performed on the first tool, a change to an unconditional starting symbol is instructed for a specific condition starting symbol that is selected from the information of the m types of condition starting symbol to which the fourth programs have been added by the program addition component and that is located in the user interface screen being designed, generates the unconditional starting symbol from the specific condition starting symbol located in the screen by changing the fourth program added to the information of the specific condition starting symbol located in the screen to the third program that, when the user interface screen in which the symbol is located is called at a time of operation, causes processing to be performed by a computer which processing causes the specific second program whose corresponding processing is executable to be started and causes the corresponding processing to be executed.

* * * * *